United States Patent
Yang et al.

(10) Patent No.: US 6,931,157 B2
(45) Date of Patent: Aug. 16, 2005

(54) BI-DIRECTIONAL MOTION COMPENSATION METHOD TO REDUCE THE NUMBER OF REGISTERS

(75) Inventors: Ying-Chih Yang, Hsinchu (TW); Han-Liang Chou, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 0 days.

(21) Appl. No.: 10/844,951

(22) Filed: May 12, 2004

(65) Prior Publication Data

US 2004/0210609 A1 Oct. 21, 2004

(30) Foreign Application Priority Data

Feb. 16, 2004 (TW) ........................................ 93103591 A

(51) Int. Cl.$^7$ .............................................. G06K 9/36
(52) U.S. Cl. .................................................... 382/236
(58) Field of Search ................................ 382/232, 236, 382/238, 248, 250, 251; 375/240.12, 240.15, 240.16, 240.18, 240.2; 348/384.1, 394.1, 395.1, 400.1–403.1, 407.1, 409.1, 413.1, 416.1, 430.1, 431.1

(56) References Cited

U.S. PATENT DOCUMENTS 5,694,173 A * 12/1997 Kimura et al. ........... 348/423.1
5,699,128 A * 12/1997 Hayashi ....................... 348/699
6,148,109 A * 11/2000 Boon et al. .................. 382/238
6,493,385 B1 * 12/2002 Sekiguchi et al. ...... 375/240.03

* cited by examiner

Primary Examiner—Jose L. Couso
(74) Attorney, Agent, or Firm—J.C. Patents

(57) ABSTRACT

A method for bi-directional motion compensation is provided. The method comprises: adding the predicted error twice, the first predictor, and one to obtain a first calculation result; wherein if the first calculation result is larger than a maximum positive value storable in the register, either the maximum positive value or a value of the maximum positive value minus one is stored in the register, otherwise the first calculation result is stored in the register; adding the value stored in the register and the second predictor to obtain a second calculation result; wherein if the second calculation result is larger than the maximum positive value storable in the register, either the maximum positive value or the value of the maximum positive value minus one is stored in the register, if the second calculation result is smaller than zero, a zero is stored in the register, otherwise the second calculation result is stored in the register; right-shifting the value one bit to obtain the pixel data.

6 Claims, 3 Drawing Sheets

BI-DIRECTIONAL MOTION COMPENSATION METHOD TO REDUCE THE NUMBER OF REGISTERS

CROSS-REFERENCE TO RELATED APPLICATION

This application claims the priority benefit of Taiwan application serial no. 93103591, filed on Feb. 16, 2004.

BACKGROUND OF THE INVENTION

1. Field of the Invention

This invention generally relates to a method for bi-directional motion compensation, and more particularly to a method for bi-directional motion compensation to reduce the number of the registers.

2. Description of Related Art

Motion compensation is the required function to decode the ISO MPEG video image. Its major principle is to use the pervious decoded frame as a reference and to capture a block from the pervious decoded frame based on the motion vector as a predictor. By adding the predictor and the predicting error, the pixels of the present frame can be obtained.

Referring to FIGS. 1, 2, and 3, FIG. 1 shows the uni-directional motion compensation by using the predictor captured from the forward reference; FIG. 2 shows the uni-directional motion compensation by using the predictor captured from the backward reference; FIG. 3 shows the bi-directional motion compensation by averaging the predictors captured from the backward reference and the forward reference. In FIG. 3, we assume that the predictor captured from the forward reference is pel_pred_forward [y][x] and the predictor captured from the backward reference is pel_pred_backward[y][x], and by using the Inverse Discrete Consine Transform (IDCT), the predicted error is f[y][x]. Hence, the pixel data d[y][x] of the present frame can be obtained according to the MPEG standard as follows:

1. Averaging the predictors captured from the backward reference and the forward reference.

```
for(y=0;y<8;y++){
    for(x=0;x<8;x++){
        pel_pred[y][x]=( pel_pred_forward[y][x]+pel_pred_backward[y][x])//2 ... (1)
    }
}
```

Wherein "//2" means that it was divided by 2 and then rounded to nearest integer. Half-integer values were rounded away from zero.

2. Adding the average and the predicted error, and limiting the range of the pixel data to obtain the pixel data of the present frame. Because the length of the pixel data is 8 bits, the data ranges from 0–255.

```
for(y=0;y<8;y++){
    for(x=0;x<8;x++){
        d[y][x]=pel_pred[y][x] +f[y][x] ; ... (2)
        if(d[y][x]<0) d[y][x]=0 ;
        if(d[y][x]>255) d[y][x]=255 ;
    }
}
```

The above calculation steps will be performed by the hardware as shown in FIG. 4. In FIG. 4, it requires the IDCT register 410 to store the predicted error f[y][x] and the predictor register 420 to store the predictor pel_pred_forward[y][x] captured from the forward reference or the predictor pel_pred_backward[y][x] captured from the backward reference in order to perform bi-directional motion compensation.

In FIG. 4, as shown in the above formulae, the predictor pel_pred_forward [y][x] is obtained from the memory interface 430 and then stored in the predictor register 420. Then the predictor pel_pred_backward[y][x] is obtained from the memory interface 430. Then the operation of averaging the predictor pel_pred_forward [y][x] and the predictor pel_pred_backward[y][x] is performed. The average result and the predicted error f[y][x] in IDCT register 410 are added up. The added result passes through the limit operator 450 so that the pixel data d[y][x] can be limited between 0 and 255.

Because during the calculation, the memory interface 430 sends the predictor pel_pred_forward [y][x] to the predictor register 420 and the predictor pel_pred_backward[y][x] is obtained from the memory interface 430, if the predictor register 420 only has the size to store one predictor, i.e., only has 8 bits, it is required to alternately capture the predictor pel_pred_forward [y][x] and the predictor pel_pred_backward[y][x], which significantly affect the access efficiency of the DRAM. Hence, the conventional art generally increase the size of the predictor register 420 in order to capture several predictor data at a time to enhance the access efficiency of the DRAM. However, this conventional art will also increase the hardware cost.

SUMMARY OF THE INVENTION

Accordingly, the present invention is directed to a method for bi-directional motion compensation without using the predictor register to maintain the access efficiency of the DRAM.

According to an embodiment of the present invention, the method for bi-directional motion compensation is imple- mented by using a register to calculate a pixel data of a present frame based on a first predictor, a second predictor, and a predicted error. The method comprises adding the predicted error twice, the first predictor, and one to obtain a first calculation result, wherein if the first calculation result is larger than a maximum positive value storable in the register, either the maximum positive value or a value of the maximum positive value minus one is stored in the register, otherwise, the first calculation result is stored in the register. The value stored in the register and the second predictor are added to obtain a second calculation result, wherein if the second calculation result is larger than the maximum positive value storable in the register, either the maximum positive value or the value of the maximum positive value minus one is stored in the register, if the second calculation result is smaller than zero, a zero is stored in the register, otherwise the second calculation result is stored in the register and the value is right-shifted one bit to obtain the pixel data.

In an embodiment of the present invention, the first predictor is captured from a forward reference and the second predictor is captured from a backward reference; or the first predictor is captured from a backward reference and the second predictor is captured from a forward reference.

In an embodiment of the present invention, each of the first predictor, the second predictor, and the pixel data has an 8-bit positive value; the predicted error has a 9-bit positive or negative value; and the register has a 10-bit length.

In an embodiment of the present invention, the step of determining whether the first calculation result is larger than the maximum positive value and is storable in the register includes determining whether a 1-bit right-shifted value of the first calculation is larger than 255.

In an embodiment of the present invention, the step of determining whether the second calculation result is larger than the maximum positive value and is storable in the register includes determining whether a 1-bit right-shifted value of the second calculation is larger than 255.

In light of the above, by applying the method for bi-directional motion compensation of the present invention, the predictor register is not required and this method can also meet the MPEG standard and maintain the access efficiency of the DRAM at the same time.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE EMBODIMENTS

To facilitate description of the present invention, we assume that the predictor pel_pred_forward[y][x] captured from the forward reference is F; the predictor pel_pred_backward[y][x] captured from the backward reference is B; the calculated pixel data d[y][x] is D; the predicted error f[y][x] from the IDCT output is I. We also assume that each of the predictor F, the predictor B, and the pixel data D has an 8-bit positive value and the estimated error I has a 9-bit positive or negative value. Hence the formula (1) can be represented as pel_pred[y][x]=(F+B)//2. Because each of the predictors F and B is a positive integral between 0 and 255, the formula (1) can further be represented as pel_pred[y][x]=(F+B+1)>>1, wherein ">>1" means that the result is right-shifted one bit.

In addition, the formula (2) can be represented as D=pel_pred[y][x]+I=I+(F+B+1)>>1. To omit the predictor register 420 in FIG. 4, the predictors F and B are obtained from the memory interface 430 and are immediately added with the predicted error I in IDCT register 410. Hence, the formula (2) can be further represented as D=((2*I+1+F)+B)>>1 or D=((2*I+1+B)+F)>>1. Therefore, if the IDCT register 410 is expanded to a 10-bit register, the pixel data can be calculated according to the MPEG standard as follows:

1. Adding the predicted error I twice, the predictor F or B (here we use F as an example), and one to obtain a first calculation result; if the first calculation result is larger than a maximum positive value storable in the register 510 of FIG. 5, either the maximum positive value or a value of the maximum positive value minus one is stored in that register, otherwise the first calculation result is stored in the register. The calculation is shown as follows:

if(($2*I+1+F$)>511)

result=2*255+1; (or result=2*255;)
else
    result=(2*I+1+F);
endif

Wherein the expression "if((2*I+1+F)>511)" can be replaced by

"if((($2*I+1+F$)>>1)>255)".

2. Adding the value stored in the register and the predictor F or B (here we use B as an example) to obtain a second calculation result; if the second calculation result is larger than the maximum positive value storable in the register, either the maximum positive value or the value of the maximum positive value minus one is stored in the register, if the second calculation result is smaller than zero, a zero is stored in the register, otherwise the second calculation result is stored in the register; the value in the register 510 is right-shifted one bit to obtain the pixel data D. The calculation is shown as follows:

if(($result+B$)>511)

result=2*255+1; (or result=2*255;)
else if ((result+B)<0)
    result=0;
else
    result=(result+B)
endif
D=result>>1;

Wherein the expressions "if((result+B)>511)" and "else if ((result+B)<0)" can be replaced by "if(((result+B)>>1)>255)" and "else if (((result+B)>>1)<0)".

Figure 1:
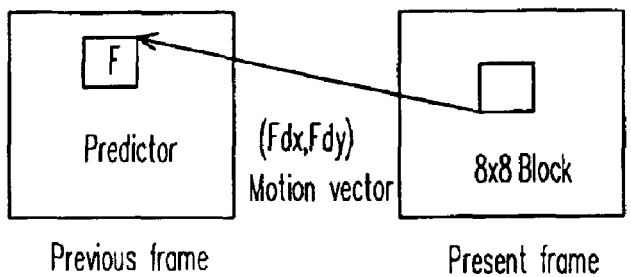
FIG. 1 shows a uni-directional motion compensation by using a predictor captured from a forward reference.
Figure 2:
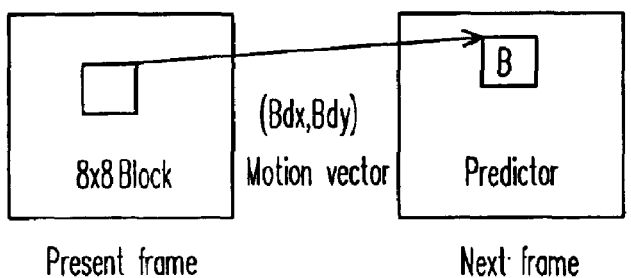
FIG. 2 shows a uni-directional motion compensation by using a predictor captured from a backward reference.
Figure 3:
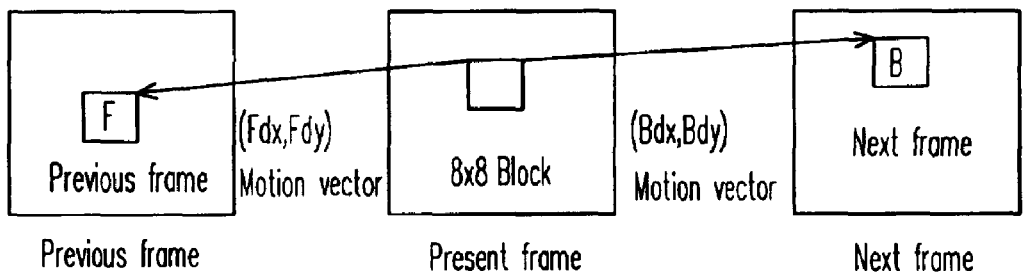
FIG. 3 shows a bi-directional motion compensation by averaging predictors captured from a backward reference and a forward reference.
Figure 4:
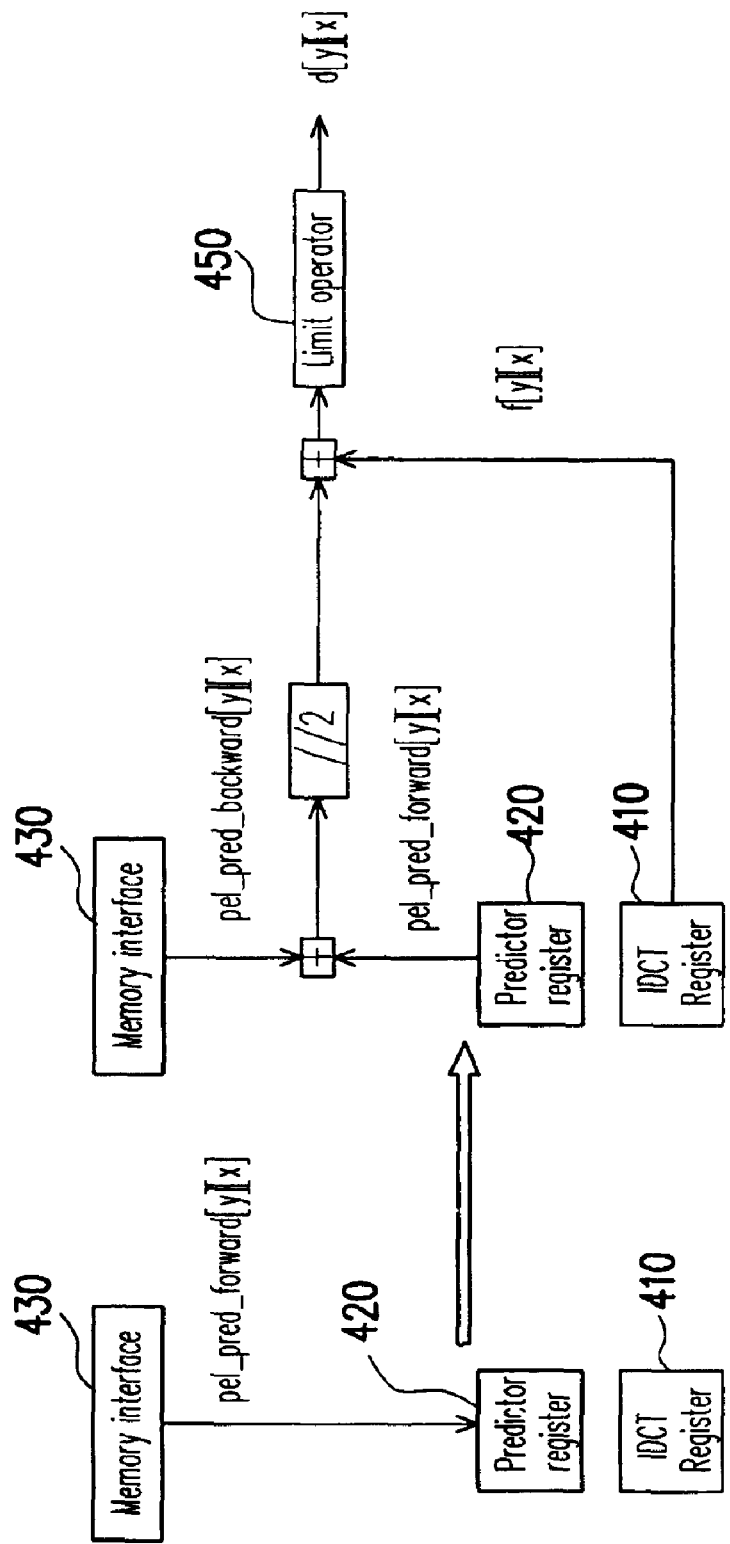
FIG. 4 shows a block diagram of a conventional bi-directional motion compensation circuit.
Figure 5:
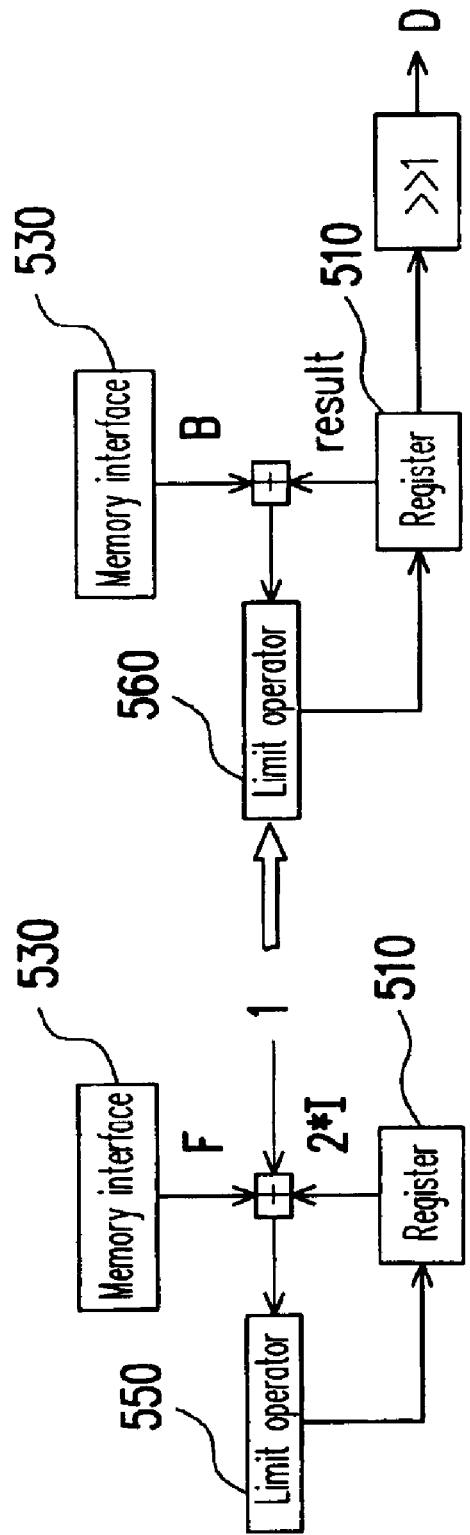
FIG. 5 shows a block diagram of a bi-directional motion compensation circuit in accordance with an embodiment of the present invention.

FIG. 5 shows the block diagram of a bi-directional motion compensation circuit in accordance with a preferred embodiment of the present invention. In FIG. 5, the predictor register 420 of FIG. 4 has been omitted, and the length of the register 510 for storing the predicted error I is 10 bits in order to store the value of 2*I.

As shown in FIG. 5, the predictor F is obtained from the memory interface 530 and the calculation of adding the predicted error I twice, the predictor F, and one is performed. Then the limit operator 550 will limit the result to the maximum positive value storable in the register 510 and send the limited result to the register 510. After that, the predictor B is obtained from the memory interface 530 in order to add the result in the register 510 and the predictor B. Then the limit operator 550 will limit the result to between zero and the maximum positive value that can be stored in the register 510 and send the limited result to the register 510. Then the value stored in the register 510 will be right-shifted one bit to obtain the pixel data D.

Hence, in FIG. 4, to maintain the access efficiency of DRAM, the conventional art uses the predictor register having N 8-bit registers and the IDCT register 410 having N 9-bit registers. However, in FIG. 5, it only requires N 10-bit registers to achieve the same result. Hence, the present invention at least can save 8N−N=7N bits register cost, which significantly reduces the hardware cost.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A method for bi-directional motion compensation using a register to calculate a pixel data of a present frame based on a first predictor, a second predictor, and a predicted error, said method comprising:

adding said predicted error twice, said first predictor, and one to obtain a first calculation result;

wherein if said first calculation result is larger than a maximum positive value that is storable in said register, either said maximum positive value or a value of said maximum positive value minus one is stored in said register, otherwise said first calculation result is stored in said register;

adding said value stored in said register and said second predictor to obtain a second calculation result;

wherein if said second calculation result is larger than said maximum positive value that is storable in said register, either said maximum positive value or a value of said maximum positive value minus one is stored in said register, and if said second calculation result is smaller than zero, a zero is stored in said register, otherwise said second calculation result is stored in said register; and right-shifting said value one bit to obtain said pixel data.

2. The method of claim 1, wherein said first predictor is captured from a forward reference and said second predictor is captured from a backward reference.

3. The method of claim 1, wherein said first predictor is captured from a backward reference and said second predictor is captured from a forward reference.

4. The method of claim 1, wherein each of said first predictor, said second predictor, and said pixel data has a 8-bit positive value, said predicted error has a 9-bit positive or negative value, and said register has a 10-bit length.

5. The method of claim 4, wherein said step of determining whether said first calculation result is larger than said maximum positive value that is storable in said register includes determining whether one-bit right-shifted value of said first calculation is larger than 255.

6. The method of claim 4, wherein said step of determining whether said second calculation result is larger than said maximum positive value that is storable in said register includes determining whether one-bit right-shifted value of said second calculation is larger than 255.

* * * * *